(12) United States Patent
Baker

(10) Patent No.: US 12,105,486 B1
(45) Date of Patent: Oct. 1, 2024

(54) REAR VIEW MIRROR REMOTE CONTROL SYSTEM

(71) Applicant: Scott Baker, Sherman Oaks, CA (US)

(72) Inventor: Scott Baker, Sherman Oaks, CA (US)

( * ) Notice: Subject to any disclaimer, the term of this patent is extended or adjusted under 35 U.S.C. 154(b) by 663 days.

(21) Appl. No.: 17/214,862

(22) Filed: Mar. 28, 2021

(51) Int. Cl.
*B60R 1/02* (2006.01)
*B60R 1/04* (2006.01)
*G05B 15/02* (2006.01)

(52) U.S. Cl.
CPC ............... *G05B 15/02* (2013.01); *B60R 1/04* (2013.01)

(58) Field of Classification Search
CPC .................................. B60R 1/04; G05B 15/02
USPC ............................................................. 701/49
See application file for complete search history.

(56) References Cited

U.S. PATENT DOCUMENTS

| 6,087,953 | A | * | 7/2000 | DeLine | B60R 1/12 |
| | | | | | 359/872 |
| 9,315,154 | B1 | * | 4/2016 | Gibbs | B60R 1/04 |
| 10,442,360 | B2 | * | 10/2019 | LaCross | B60R 1/04 |
| 2022/0340080 | A1 | * | 10/2022 | Cao | G02F 1/161 |

* cited by examiner

*Primary Examiner* — Peter D Nolan
*Assistant Examiner* — Luke Huynh

(57) ABSTRACT

A rear view mirror having one motor rotating the viewing angle of the mirror about the vertical axis and one motor rotating the viewing angle of the mirror about the horizontal axis, both motors working in unison to provide a multitude of viewing angles for the user, the motors controlled by user requests by way of manually adjusting a trackball or joystick type controller, creating a safer driving experience by removing the need to have one's hand between the users eyes and the mirror while driving.

11 Claims, 23 Drawing Sheets

REAR VIEW MIRROR REMOTE CONTROL SYSTEM

FIELD AND BACKGROUND OF INVENTION

This invention relates to a vehicular rear view mirror assembly. The mirror assembly of the invention may be used in a wide spectrum of different types of spaces these may include, for example, rooms or building spaces, whether commercial or residential, as well as vehicles. The invention is not limited to these examples.

As automobiles have evolved over the decades many elements have changed. As technology has taken hold more and more of the functions "behind the scenes" have been handled by computer controlled electronics, such as fuel management, braking systems management etc. The interior components of the vehicle has also been continually upgraded more and more with buttons and switches that initiate an action taken by a computer.

Even with this advancement evolution several simple areas have been left to the operator to manually adjust, items such as air conditioning vent directional grills and the center rear view mirror. The similarities in these two specific items is that to adjust both to the "correct" location for the user the user's hand and arm are constantly in the way of the user knowing if the adjustment made was correct, typically requiring the user to make multiple adjustments, each time placing their hand and arm in the direct path of knowing if the adjustment is correct.

Many, almost all vehicular manufacturers produce their products with some sort of remote adjustment ability for the rear view mirrors on the driver side and passenger side doors. The rear view mirror that is inside the vehicle and attached to the windshield has not evolved in any capacity since it was first placed inside of vehicles, it still requires the user to make a slight adjustment then move their hand and arm out of the way to view its location and then readjust potentially and typically multiple times to get the correct location for a full view out the rear glass of the vehicle. This process can be time consuming and a safety issue as constant readjusting requires attention and eyes off the road.

The mirror assembly of the invention facilitates allowing the path of one's vision to be clear of any obstacles while the mirror is being adjusted. This function would allow for desired mirror adjustments to be done in one attempt, in a much safer, effective, and efficient process allowing drivers to maintain focus on the road.

SUMMARY OF INVENTION

The invention currently defined may comprise a remotely controlled rear view mirror for a vehicle.

Center mounted rear view mirrors in vehicles today require multiple adjustments to get the mirror directed exactly where the person desires it. This is because the action taken to adjust the mirror often requires the person to have their hand and arm in such a position that it blocks the persons line of sight to the mirror. As such, the person may not know where the mirror is pointed until they move their hand and arm away from in front of the mirror they just adjusted. This is a repeatable action until the mirror direction is close enough to the desired configuration.

One embodiment of the present invention allows the user of the mirror to merely place a hand on a knob or other type of positional indicator, such as a joystick or a track ball, for example. By moving the joystick in different directions, the mirror can move up and down and from side to side as well as every combination of those two intersecting directions, something made possible by the electronics and computer coding written to direct multiple motors to move in concert with each other, either by wiring or wireless, thereby allowing for a wide range of mirror directional options.

This remote system allows the driver to keep his eyes on the road while adjusting the joystick or other control. When the mirror is in the desired location, adjustments can stop, using a mere quick glance at the mirror to verify when the location is correct.

This invention allows for a main control panel that has individual preset locations for vehicles which multiple drivers utilize at different times.

There are many ways the control panel can be configured, many operations the control panel can offer, and many ways the directional mechanism can be designed. The commonality in purpose is remotely adjusting a windshield mounted rear view mirror's direction of viewing.

While the design of each of the required components can be of varied shapes and sizes, the functionality may remain consistent in allowing a windshield mounted rear view mirror to be adjusted without touching the actual mirror itself.

BRIEF DESCRIPTION OF THE DRAWINGS

FIG. 19 Showing an exploded side view of the mirror assembly exposing the vertical base and how the horizontal structure connects to it and functions within in.

DETAILED DESCRIPTION OF THE INVENTION

Figure 1:
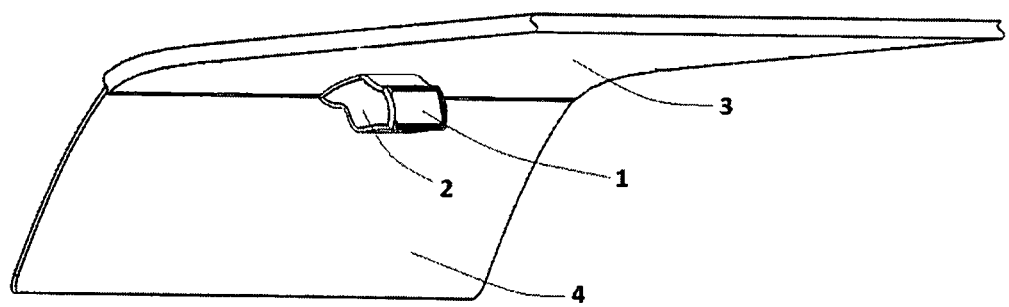
FIG. 1 Shows a break away section of a vehicle interior, specifically the roof panel, front windshield, a rear view mirror, and a cover for that mirror.

FIG. 1 Shown from a lower position looking up and into a break-away vehicle interior compartment details the reflective portion of a rear view mirror 1, its covering case 2, the roof panel 3 the case 2 attaches to, and the windshield 4.

Figure 2:
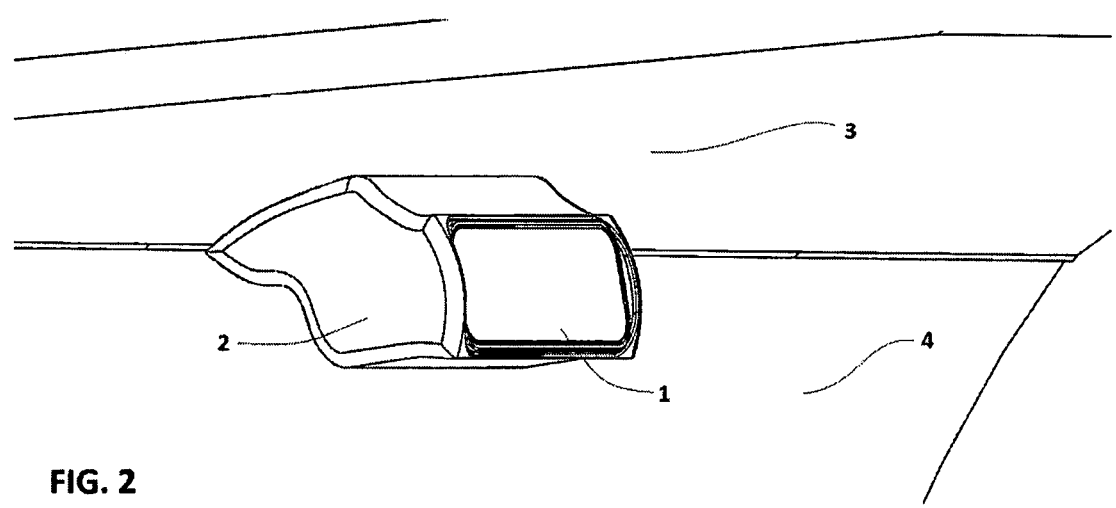
FIG. 2 Shows a close up view of the components defined in the previous figure.

FIG. 2 A close-up of FIG. 1 detailing the same components.

Figure 3:
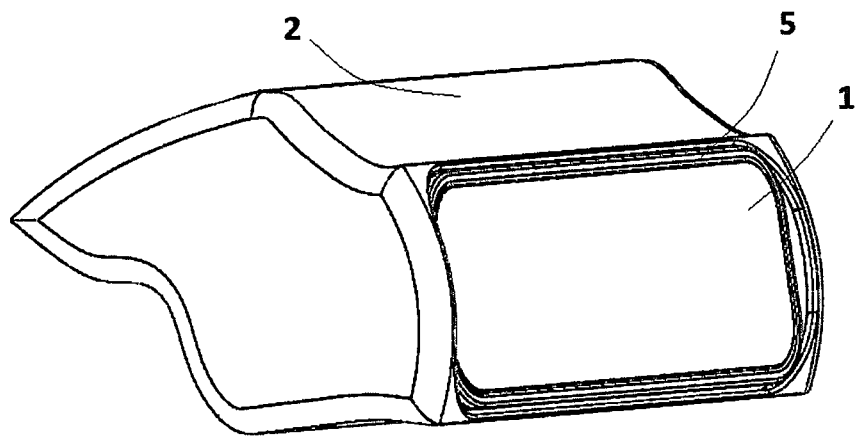
FIG. 3 Shows the rear view mirror in its cover structure.

FIG. 3 Showing the reflective component 1, its structural support frame 5, and its covering case 2.

Figure 4:
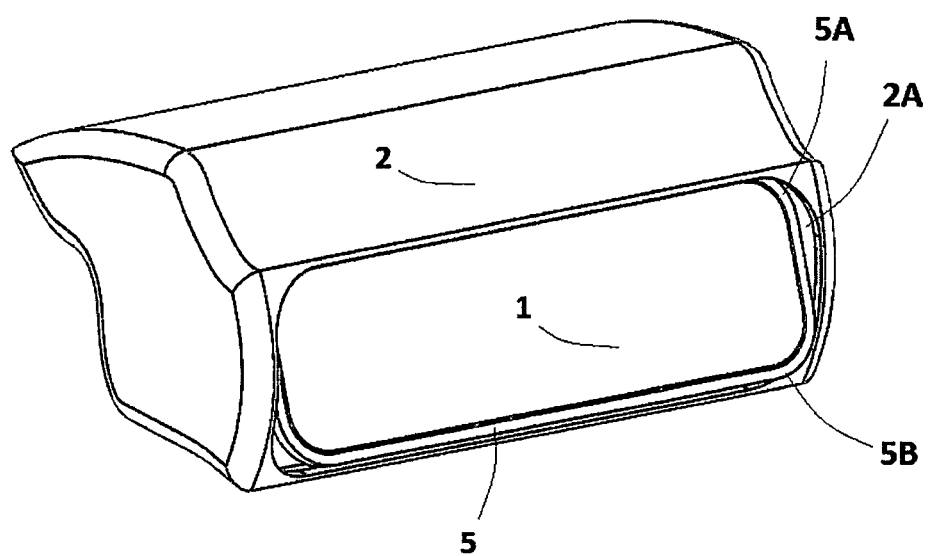
FIG. 4 Shows the same as FIG. 3 with the actual mirror tilted in an upward direction.

FIG. 4 Showing the cover 2 with the reflective surface 1 and the reflective surface frame structure 5 tilting upward as indicated by the bottom of the frame 5B protruding outward as the top of the frame 5A going inward into the cover's internal area 2A.

Figure 5:
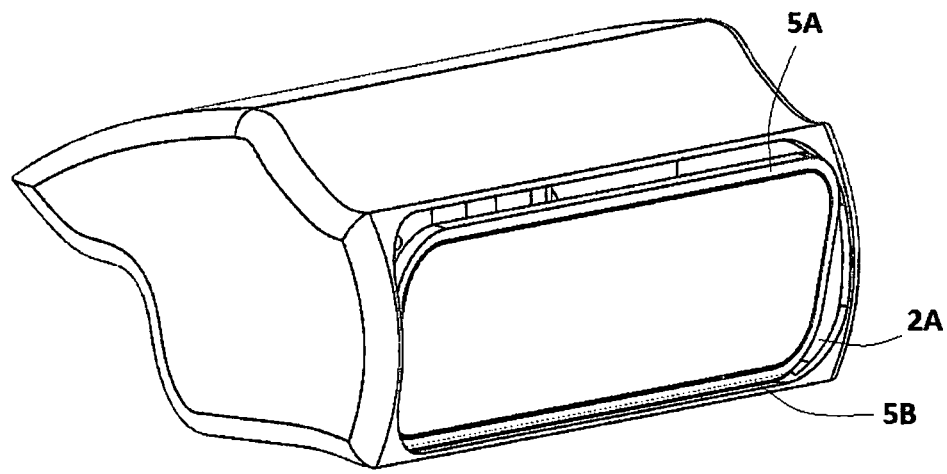
FIG. 5 Shows the same as FIG. 3 with the actual mirror tilted in a downward direction.

FIG. 5 Same as FIG. 4 except the top of the frame 5A is protruding outward as the bottom of the frame 5B is going inward into the cover's internal area 2A.

Figure 6:
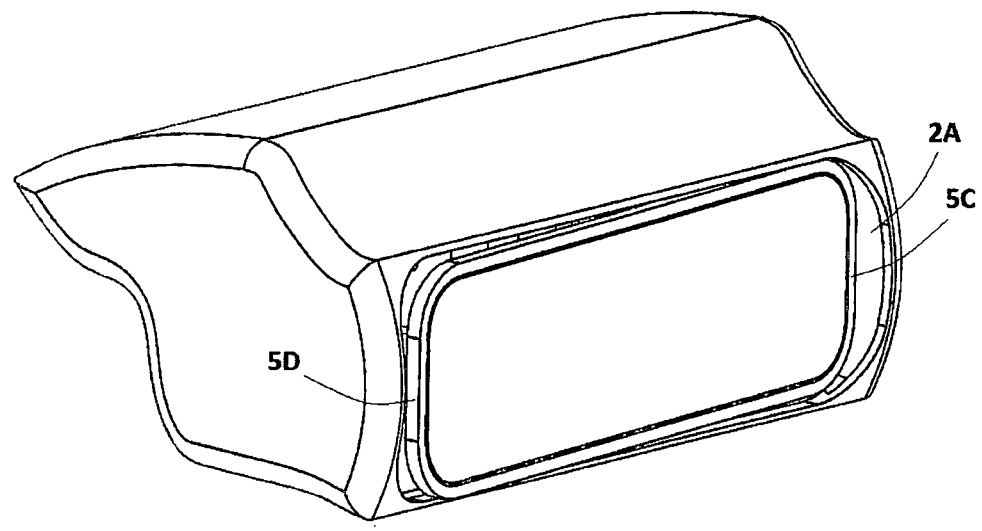
FIG. 6 Shows the same as FIG. 3 with the actual mirror tilted in a direction to the right.

FIG. 6 Same as FIG. 4 except the left side of the frame 5D is protruding outward as the right side of the frame 5C is going inward into the cover's internal area 2A.

Figure 7:
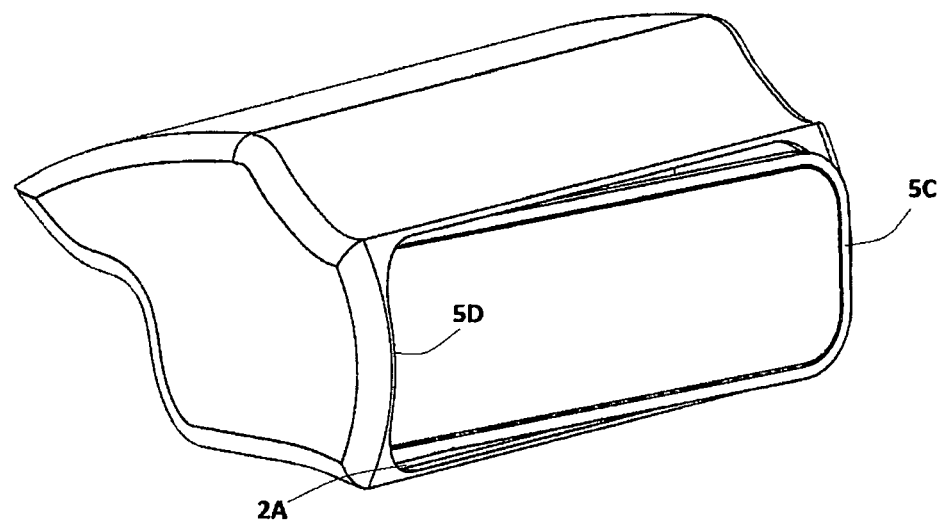
FIG. 7 Shows the same as FIG. 3 with the actual mirror tilted in a direction to the left.

FIG. 7 Same as FIG. 4 except the right side of the frame 5C is protruding outward as the left side of the frame 5D is going inward into the cover's internal area 2A.

Figure 8:
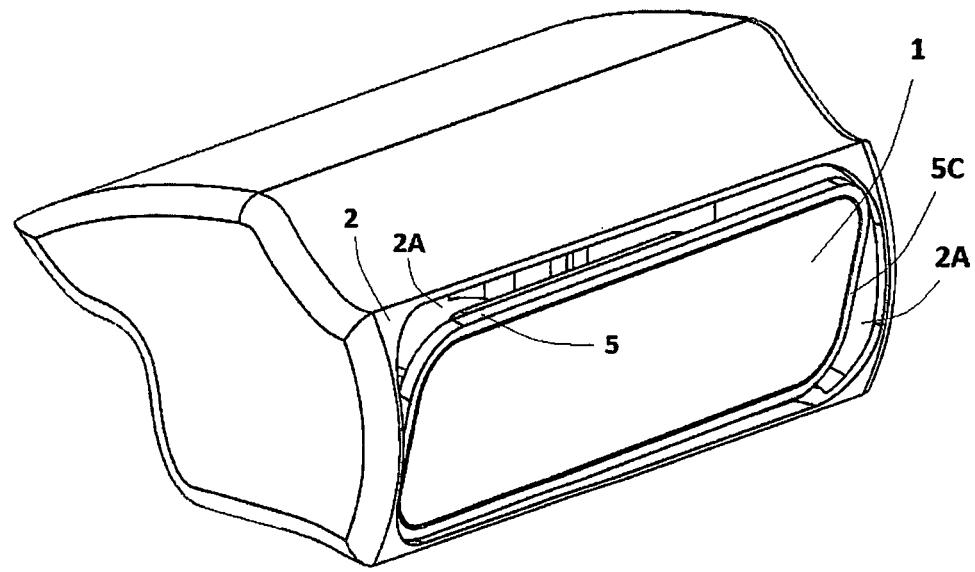
FIG. 8 Shows the same as FIG. 3 with the actual mirror tilted in a direction down and to the right.

FIG. 8 Showing the reflective component 1 and its frame 5 are pointed in a direction that is downward and to the right as indicted by the cover's internal area 2A being exposed at the right side frame 5C as well as 2A being exposed at the top of the frame 5A.

Figure 9:
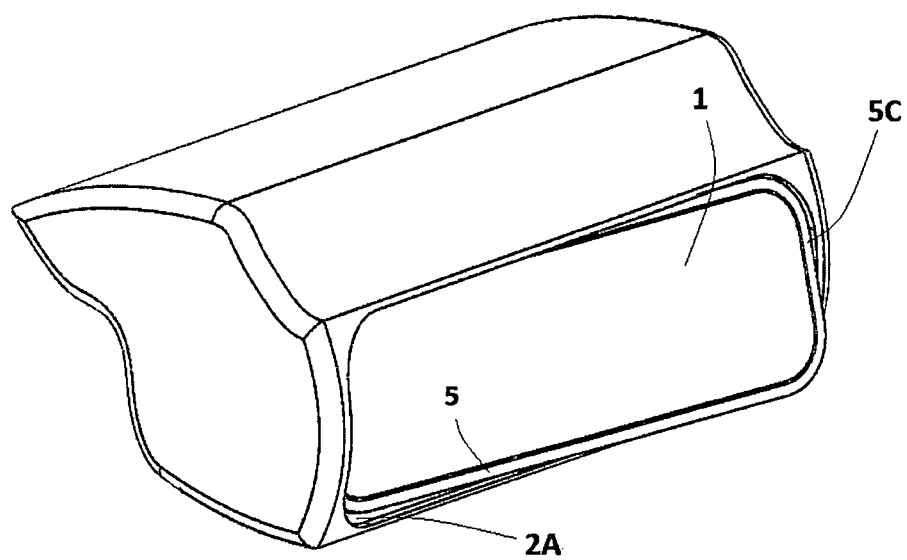
FIG. 9 Shows the same as FIG. 3 with the actual mirror tilted in a direction up and to the left.

FIG. 9 Showing the reflective component 1 and its frame 5 are pointed in a direction that is upward and to the left as indicted by the left side frame 5D disappearing into the case 2 as well as the bottom of the frame 5B protruding out over the bottom of the cover 2.

Figure 10:
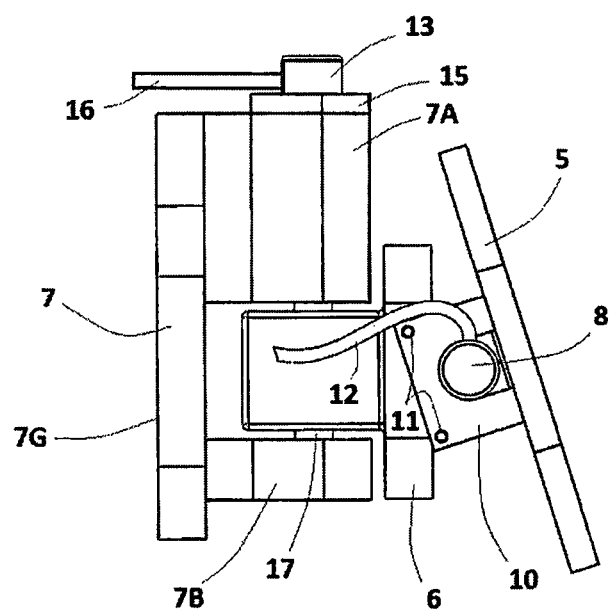
FIG. 10 Show the mirror from a side view with the cover removed exposing the inner tilting mechanisms, and the reflective mirror component containment structure tilted up.

FIG. 10 Shown in side view is the mirror assembly with the cover 2 removed. The vertical base component 7 with its to cover mounting surface 7G, the lower vertical support arm 7B, upper vertical support arm 7A which also houses the vertical rotational motor 13 with its wiring 16, the rotational motor lock plate 15, the horizontal axis base component 6 which supports the reflective component frame 5, the horizontal axis rotational motor 8 along with its wiring 12 and lock plate 10. Detailing the position of the reflective component 1 and thus frame 5 tilted upward.

Figure 11:
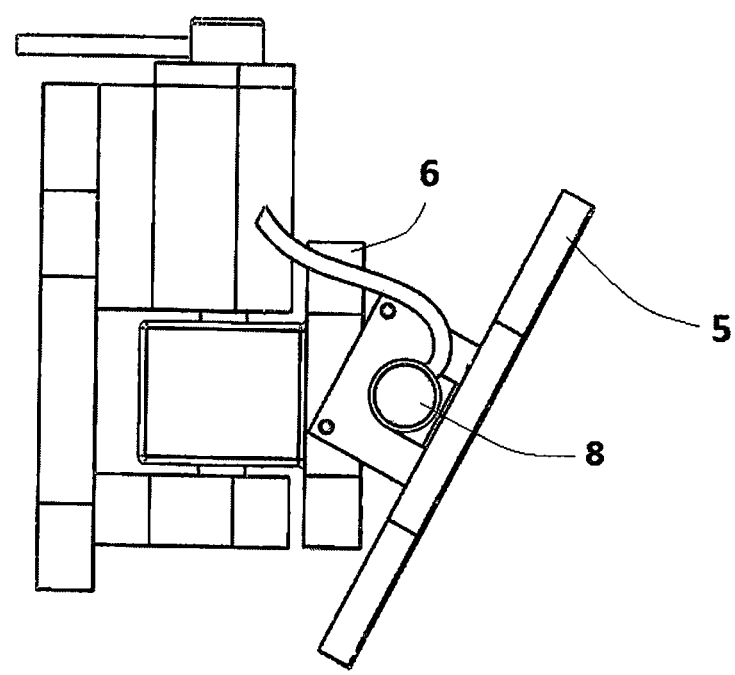
FIG. 11 Shows the same as FIG. 10 with the reflective mirror component containment structure tilted down.

FIG. 11 Similar as FIG. 10 other than the reflective component frame 5 and thus the reflective component 1 tilted downward.

Figure 12:
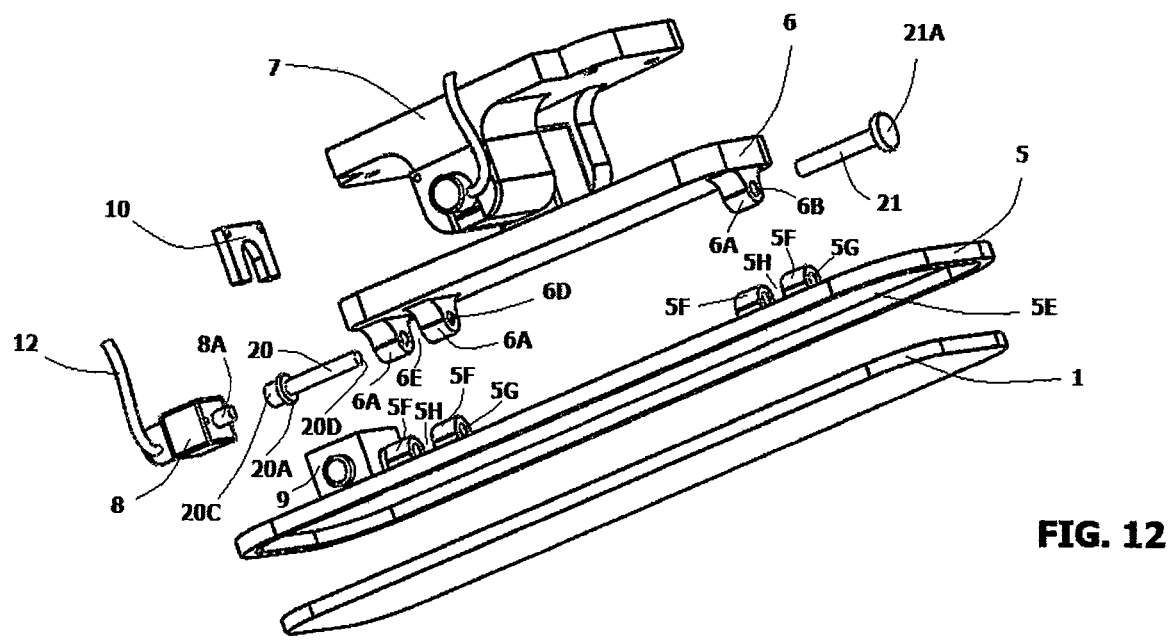
FIG. 12 Shows an exploded view from a mostly top angle exposing the horizontal base, and how the reflective component and its containment structure with pivot tabs connect using the pivot pins. The horizontal rotational motor and the vertical base are also shown.

FIG. 12 Shown in mostly top view with a bit of side view, this exploded figure showing the horizontal pivot mechanism/structures. The vertical base component 7 supporting the horizontal base component 6, the base 6 having two mounting tabs 6A that allow for horizontal axis rotational pivoting, the tab 6A on the right having a pin hole 6B while the tab on the left having a pin hole 6C with a flat surface its entire length. The reflective frame 5 having four mounting tabs 5F spaced apart to allow the base 6 mounting tabs 6A to engage the space 5H between the two mounting tabs 5F on either end of the frame 5. Alignment pivot pin 21 engages pin hole 5G in the right side holes along with hole 6B. The frame 5 having a motor mounting block 9 and a motor lock plate 10 contains the horizontal axis rotational motor 8 which has a short driveshaft 8A protruding. Horizontal long driveshaft 20 also acts as a pivot pin as it engages pin holes 5G on the left side of the assembly. Base mounting tab hole 6C having a flat portion engages the flat portion of the horizontal long driveshaft 20 which rotates the frame 5 when the horizontal axis rotational motor 8 is given directional input thus allowing the reflective frame 5 with the reflective component 1 installed to pivot on a horizontal axis moving the mirror up and down.

Figure 13:
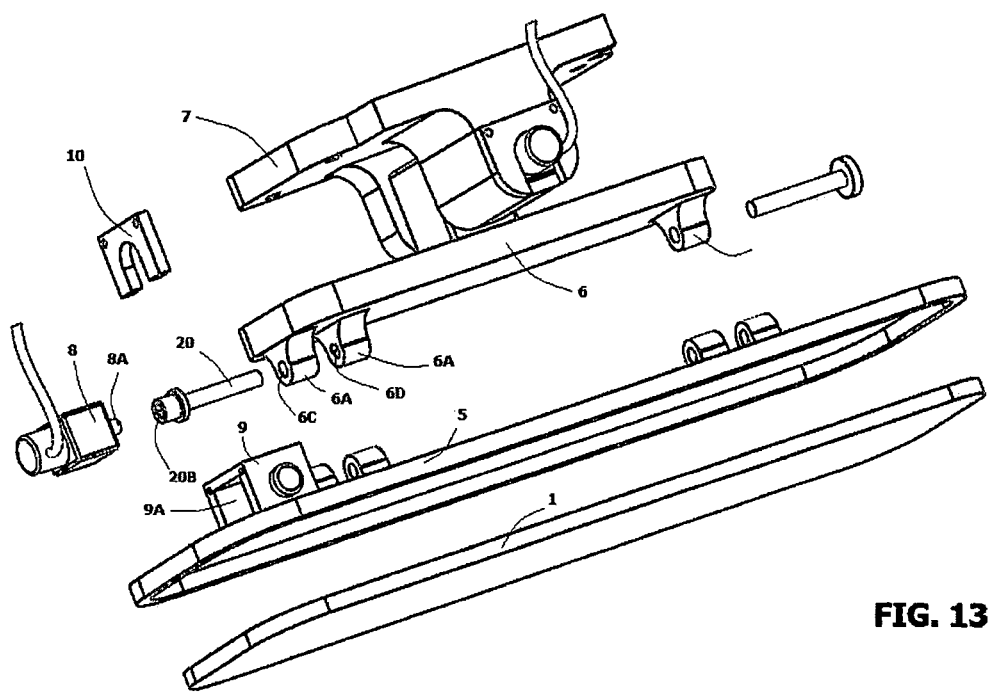
FIG. 13 Showing a close-up a mostly top view angle of FIG. 12

FIG. 13 A close-up version of FIG. 12 further detailing the flat portion in pivot pin hole 6C as well as the flat portion 20B inside the head of the horizontal long driveshaft 20 which is engaged by the drive shaft 8A of the horizontal axis rotational motor 8. Also detailed is the motor mounting block internal space 9A.

Figure 14:
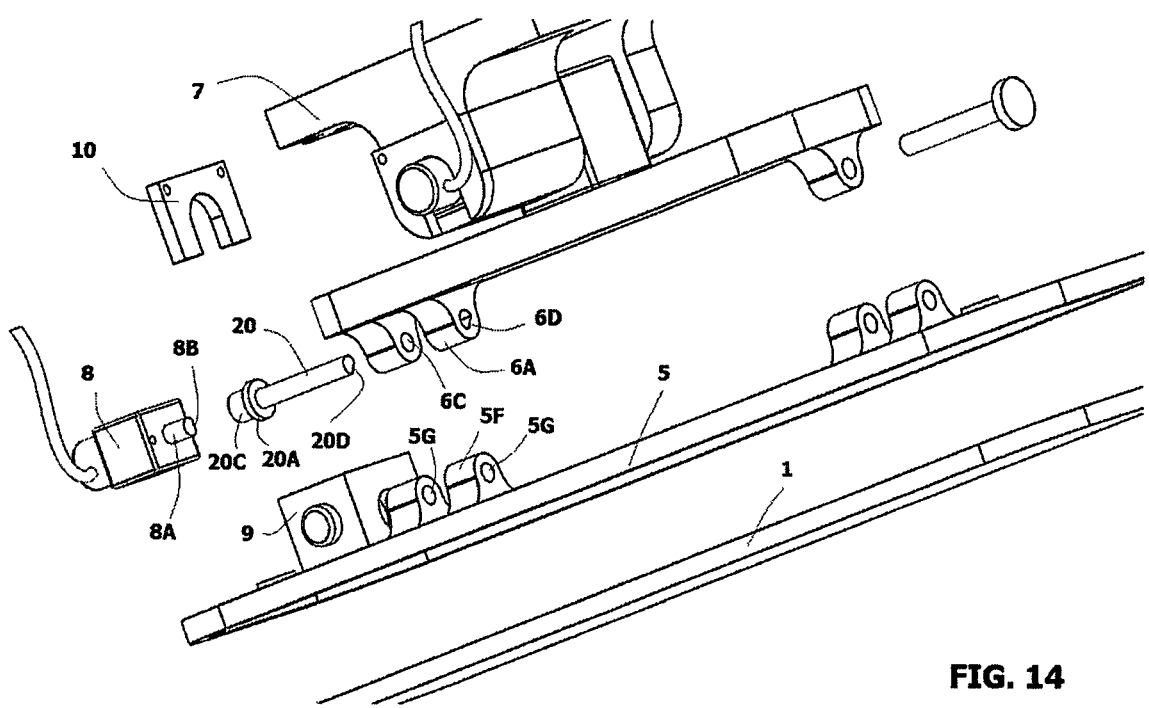
FIG. 14 Showing a close-up a mostly top view angle of FIG. 13

FIG. 14 A close-up of FIG. 13 detailing the flat surface 8B on the horizontal axis rotational motor drive shaft 8A as well as the flat 20C on the horizontal long driveshaft 20 and the flat portion inside pivot pin hole 6C. The flat surfaces on the motor short drive shaft, in the head of the long driveshaft, down the length of the long driveshaft, and in the pivot pin hole 6C allow the horizontal axis rotational motor 8 to transfer its rotational motion directly to the reflective frame 5.

Figure 15:
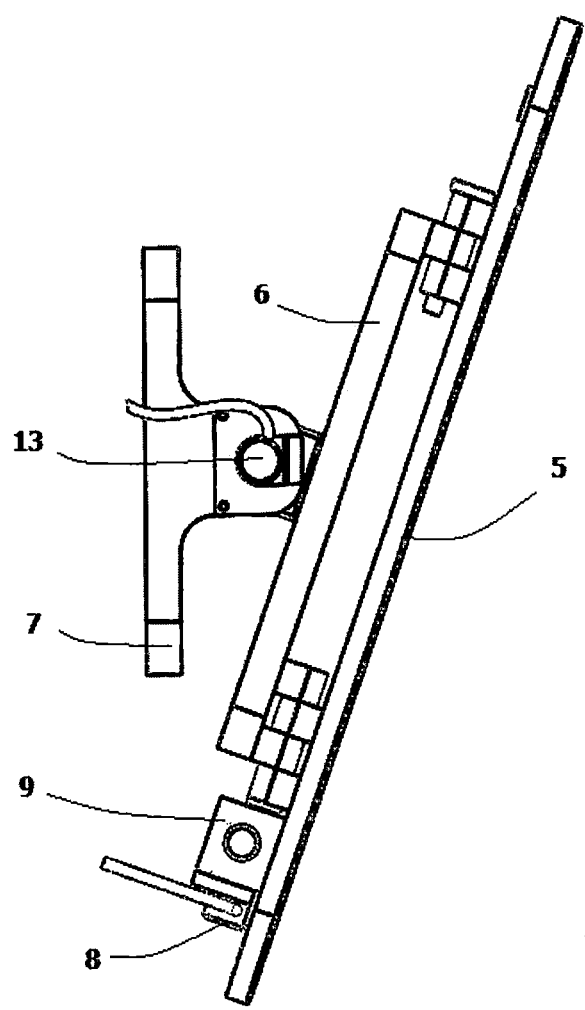
FIG. 15 Showing a top view of the mirror assembly without the cover detailing the reflective component and structure rotated to the left.

FIG. 15 Top view of the mirror assembly detailing its ability to pivot to the left. The entirety of the horizontal axis rotational structure with the frame 5, the horizontal base component 6, the motor 8, the motor mounting block 9, being mounted to the vertical base component 7 which holds vertical axis rotational motor 13.

Figure 16:
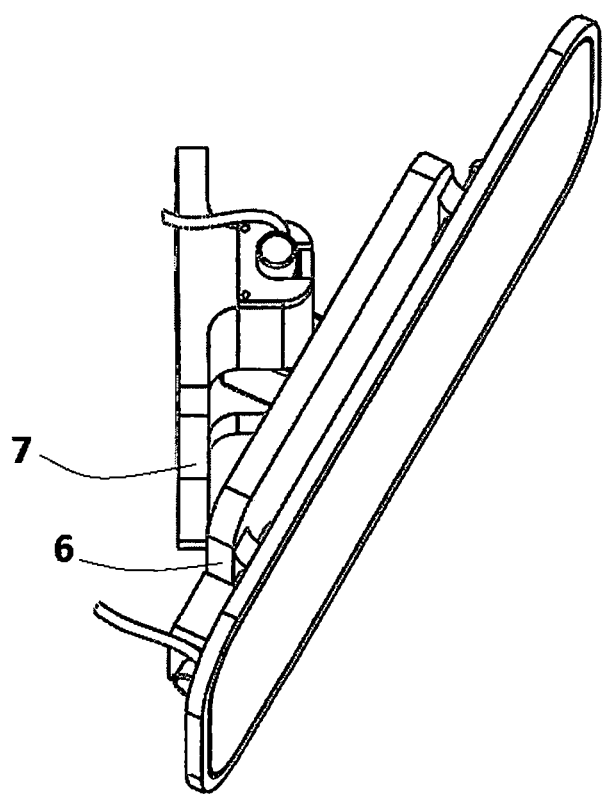
FIG. 16 Showing a top/side view angle of FIG. 15

FIG. 16 Similar to FIG. 15 and shown in top side view the horizontal base component 6 being close on one side to the vertical base component 7 indicating the reflective frame 5 and the inserted reflective component are angled to the left.

Figure 17:
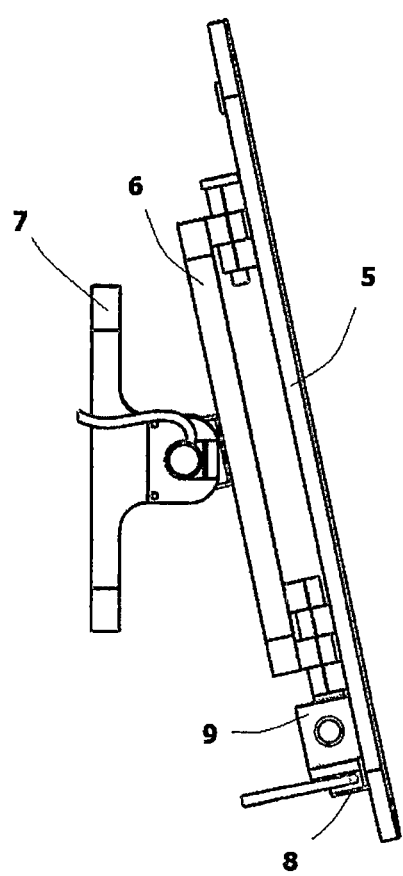
FIG. 17 Showing a top view of the mirror assembly without the cover detailing the reflective component and structure rotated to the right.

FIG. 17 Top view of the mirror assembly detailing its ability to pivot to the right. The entirety of the horizontal axis rotational structure with the frame 5, the horizontal base component 6, the motor 8, the motor mounting block 9, being mounted to the vertical base component 7 which holds vertical axis rotational motor 13.

Figure 18:
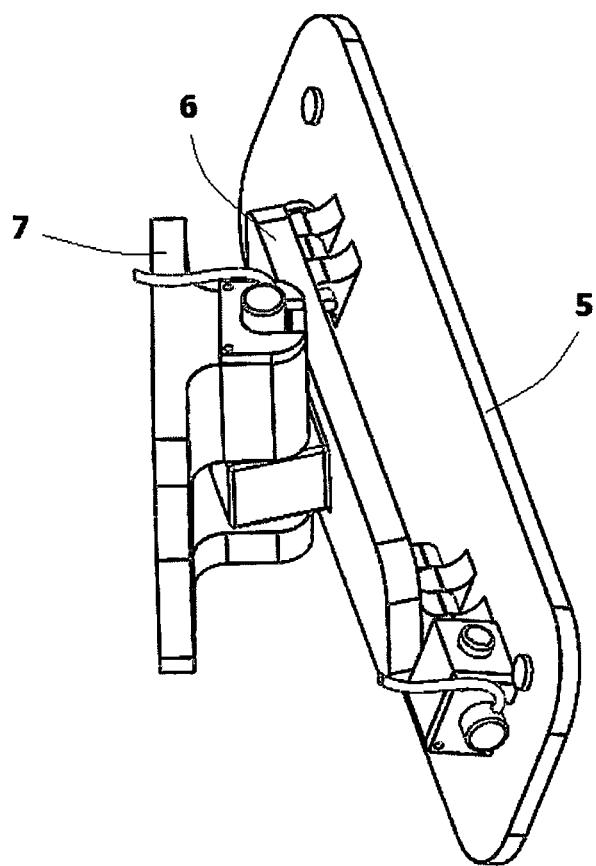
FIG. 18 Showing a top/side view angle of FIG. 17

FIG. 18 Similar to FIG. 16 and shown in top side view the horizontal base component 6 being close on one side to the vertical base component 7 indicating the reflective frame 5 and the inserted reflective component are angled to the right.

Figure 19:
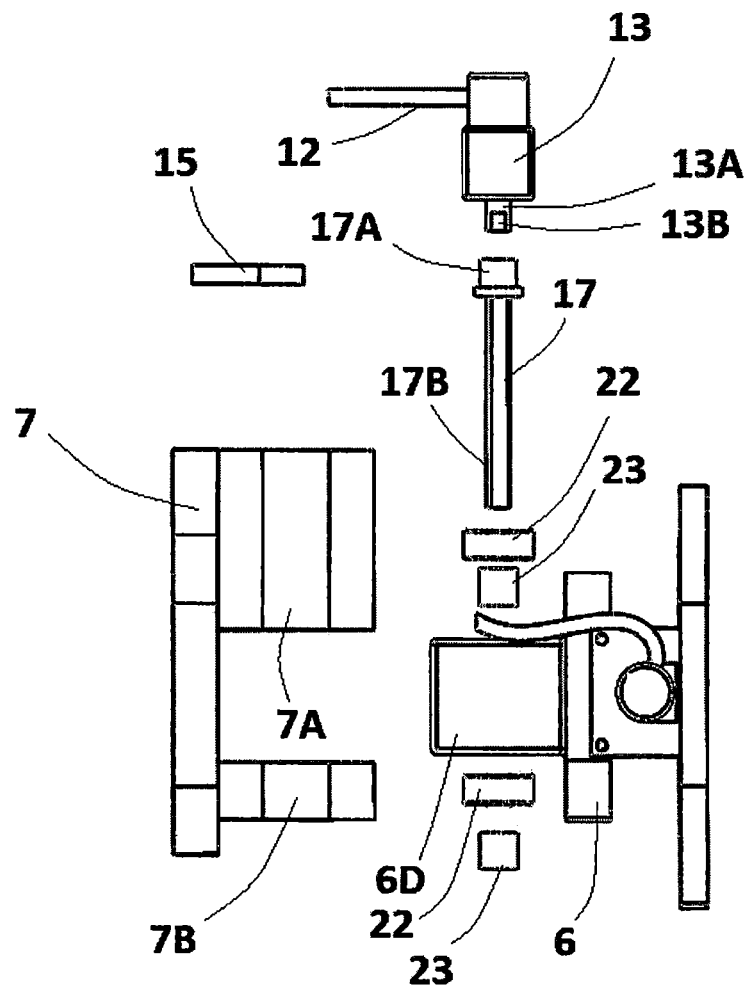

FIG. 19 Shown in side view and explode format detailing the vertical pivot mechanism/structures. Vertical base 7 having a lower support arm 7A and an upper support arm 7B and a free space between for aligning the horizontal mounting block 6D. Horizontal base 6 is shown complete with all the components detailed in previous figs. Vertical axis rotational motor 13 having a driveshaft 13A, and 13A having a flat portion 13B which engages and locks into the head 17A of the vertical long driveshaft 17 which has a flat portion 17B along its entire length. Upper spacer 23 resides in the top side of horizontal mounting block 6D and upper bearing 22 resides in the bottom side of the upper support arm 7A of the vertical base 7. Lower spacer 23 resides in the top side of the lower support arm 7B of the vertical base 7 and lower bearing 23 resides in the bottom side of the horizontal mounting block 6D.

Figure 20:
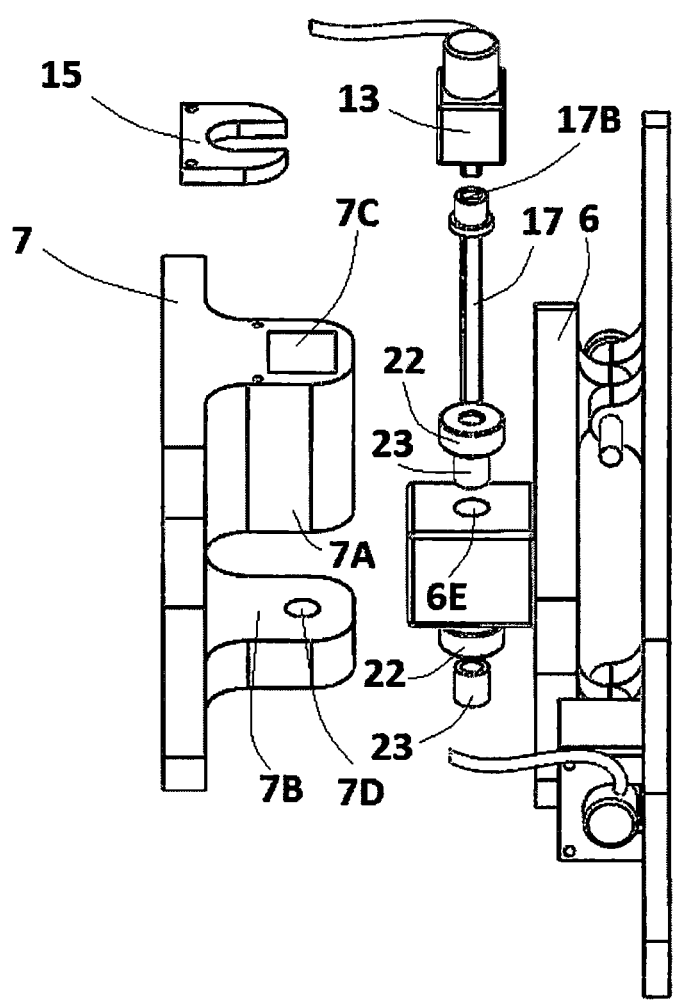
FIG. 20 Showing an exploded view of FIG. 19 from a top/side view to further expose details of the construction.

FIG. 20 Similar to FIG. 19 although detailed in a top partial side angle view. Vertical base upper support arm 7A is shown to also be the mounting block for the vertical axis rotational motor 13. Recess 7C retains the motor 13 and lock plate 15 secures the motor 13 in place. The internal flat portion of the vertical long driveshaft 17B is shown as is lower sleeve 23 receiving hole 7G and upper sleeve 23 receiving hole 6E.

Figure 21:
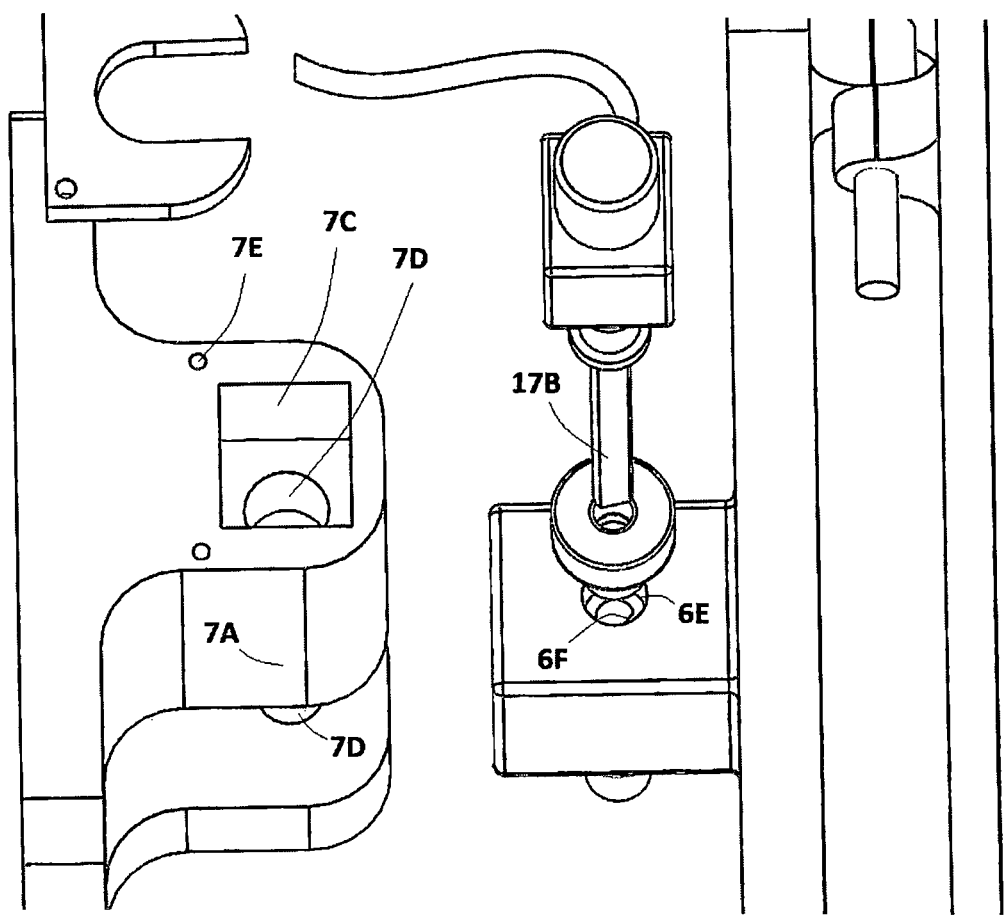
FIG. 21 Showing a close-up view of FIG. 20

FIG. 21 Similar to FIG. 20 although in close-up view and detailing the through hole 7D for the vertical long driveshaft, additionally shown is the flat portion 17B on the vertical long driveshaft and the flat 6F that is cut into the through hole 6E which locks the horizontal mounting block 6D and therefore the horizontal base 6 to the vertical axis rotational motor 13.

Figure 22:
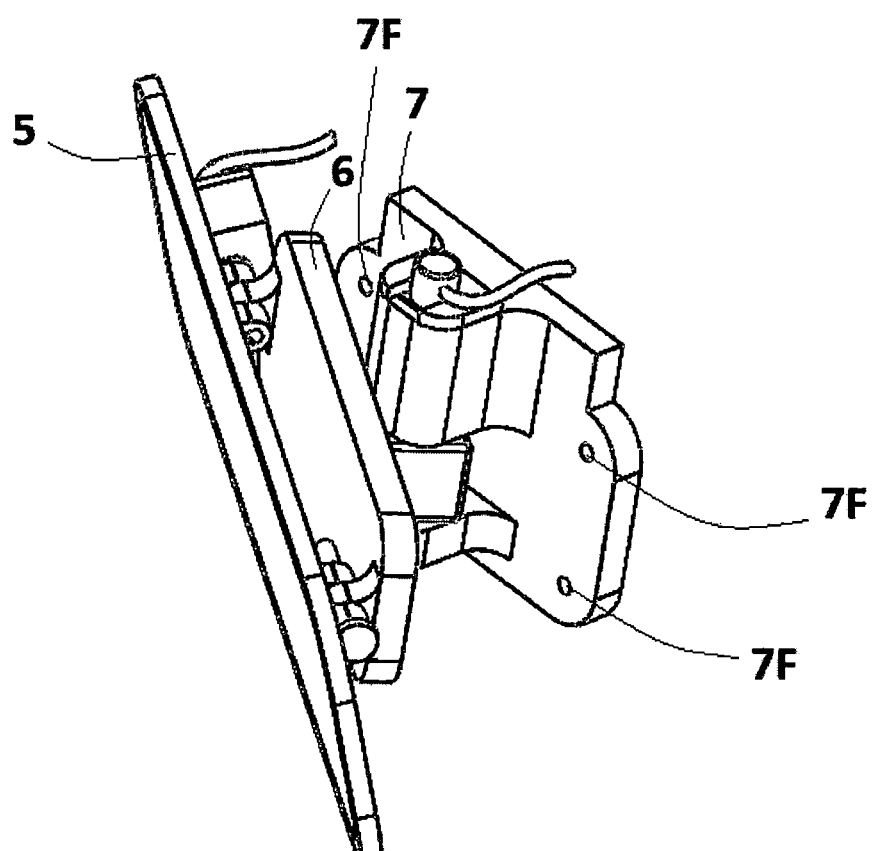
FIG. 22 Showing from a top/front/side view detailing the mirror structure holding the reflective component in a downward and to the left position.

FIG. 22 Shown in top/¾ side front view and detailing the vertical base 7 to cover 2 mounting holes 7F. Additionally detailed is the horizontal base 6 rotated on the vertical axis of the vertical base 7 to the left, while the reflective component frame 5 is rotated downward on the horizontal axis of the horizontal base 6.

Figure 23:
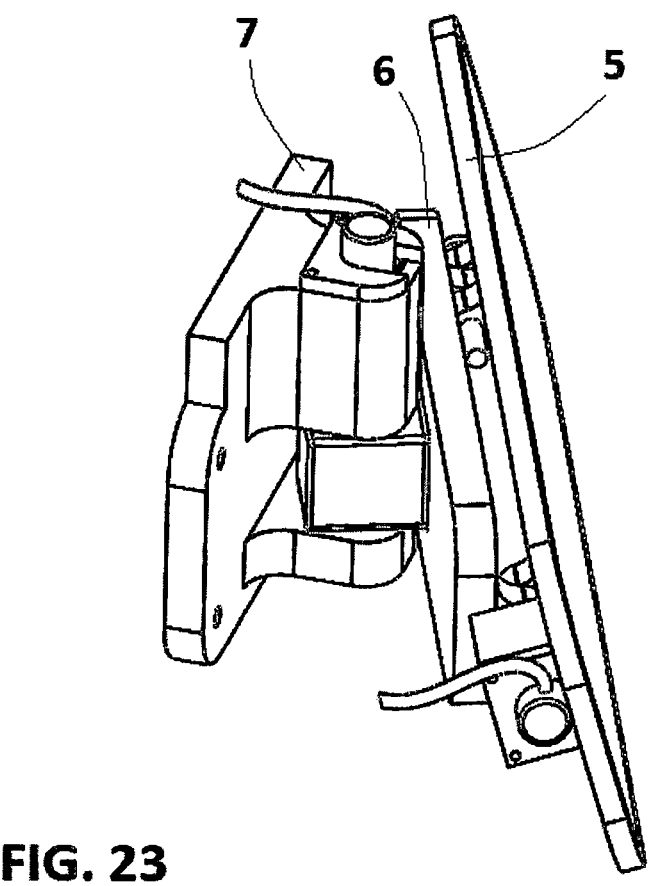
FIG. 23 Showing from a top/front/side view detailing the mirror structure holding the reflective component in an upward and to the right position.

FIG. 23 Similar to FIG. 22 although showing the horizontal base 6 rotated on the vertical axis of the vertical base 7 to the right, while the reflective component frame 5 is rotated upward on the horizontal axis of the horizontal base 6.

Figure 24:
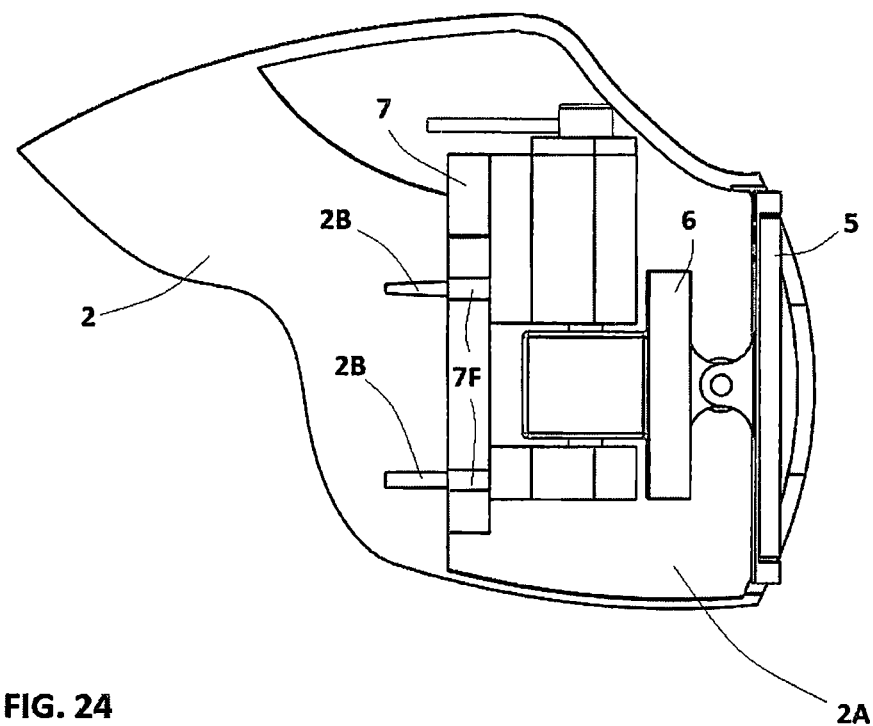
FIG. 24 Showing a side view cut-away detailing how the mirror structure mounts to the case and how the case mounts to the vehicle.

FIG. 24 Shown in side view and internal reveal format detailing the internal space 2A of the cover 2, the holes 2B for mounting the vertical base 7, as well as the cover 2 to interior roof panel mounting holes 22. The entirety of this embodiment of the current invention is shown.

Figure 25:
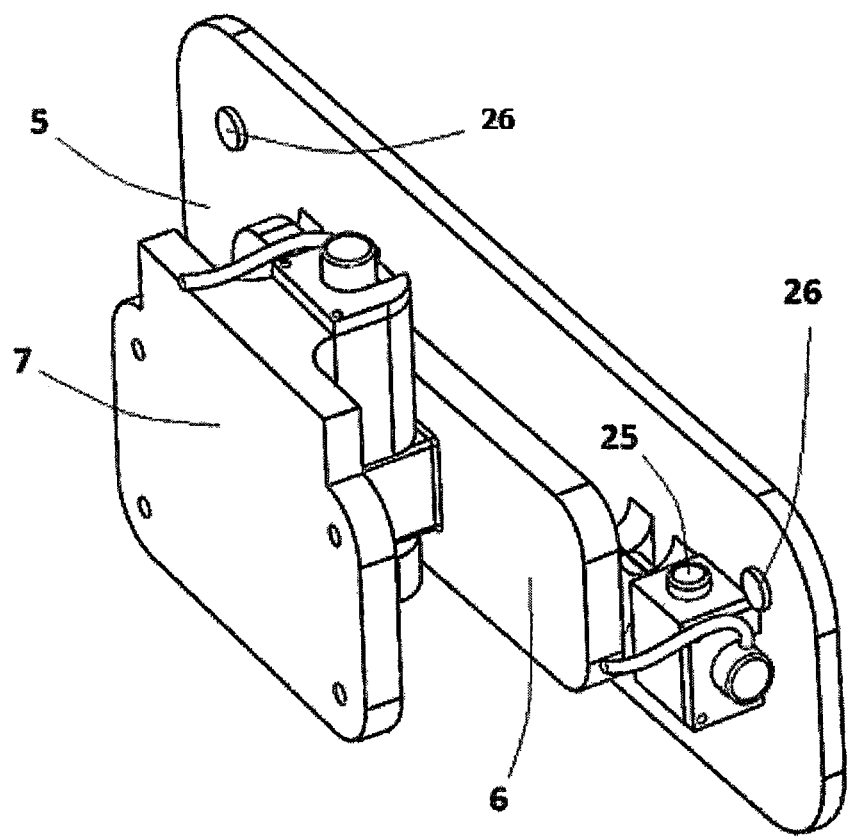
FIG. 25 Shown in ¾ top view detailing the accelerometer sensor and the two limiting sensors mounted on the reflective component frame.

FIG. 25 Shown in ¾ top view, the exposed mirror assembly with the reflective component frame 5, the horizontal base structure 6, and the vertical base structure 7, additionally detailed is the accelerometer 25 which informs the central controller if the mirror was accidentally bumped or jarred out of position by movement the controlled did not initiate as well as two limiting sensors 26 which set boundaries for the central controller when the mirror is being adjusted.

Figure 26:
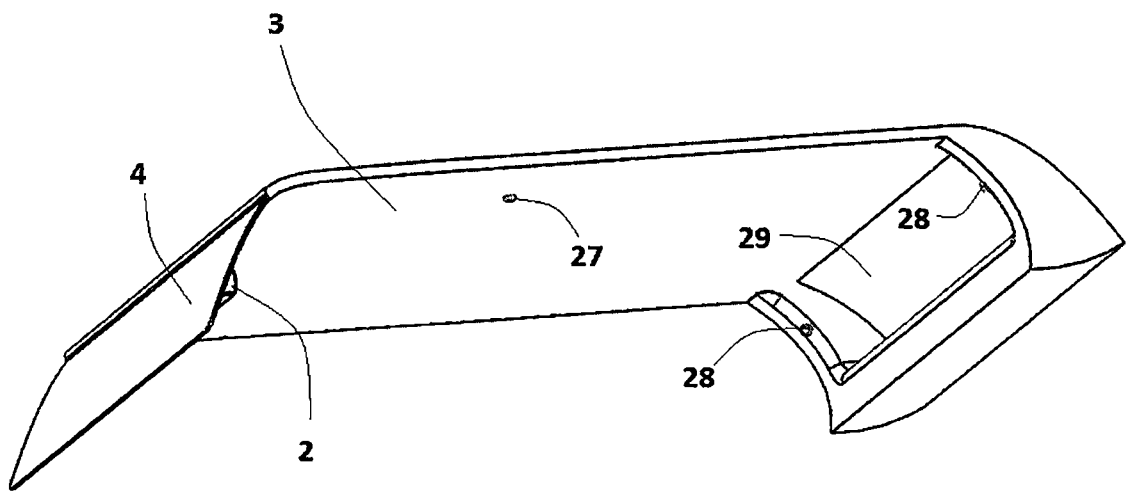
FIG. 26 Shown in bottom ¾ view, a more complete roof panel than previous drawings with the windshield and rear glass, additionally detailing the position sensor over the driver's seat and the two position sensors mounted on the B pillars (on either side of the rear glass).

FIG. 26 Shown in bottom ¾ view, a more complete roof panel 3 than previous drawings, the mirror assembly cover 2, and windshield 3, additionally detailed is the position sensor over the driver's seat 27 and the two position sensors mounted on the B pillars (on either side of the rear glass). These three sensors establish a minimum default range the mirror must reside within for safety purposes regarding the rearward vision of the driver.

Figure 27:
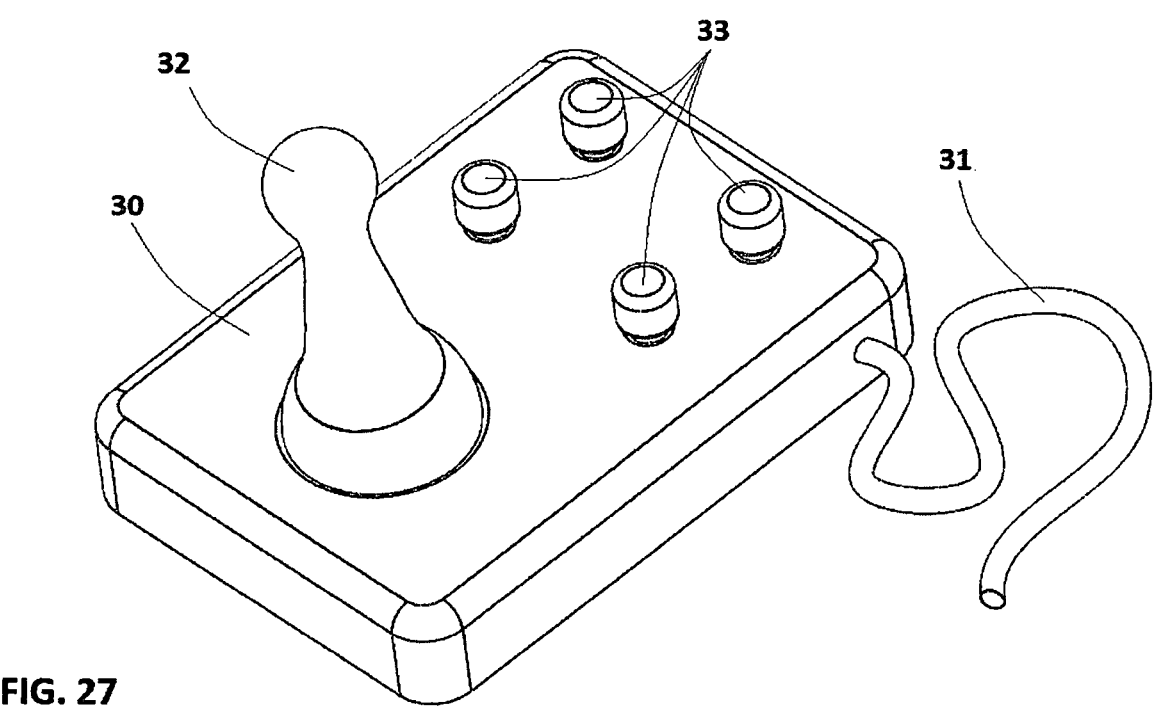
FIG. 27 Shown in ¾ top view, the control panel with a joystick type control mechanism and several preset buttons.

FIG. 27 Shown in ¾ top view, the control panel case 30 with its wiring harness 31, preset location buttons 33 and joystick type control mechanism. When the desired position is required the driver merely presses the preset button and if someone else uses the vehicle and changes the mirror position a simple push of the preset and the mirror automatically resets to that saved location information.

Figure 28:
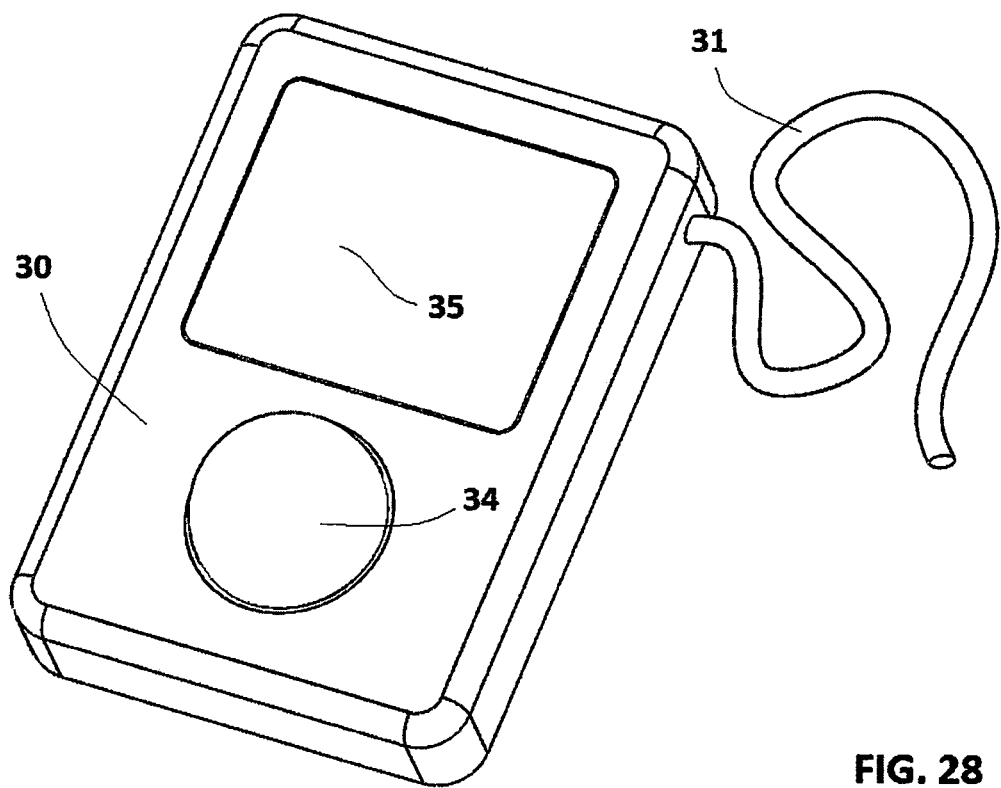
FIG. 28 Shown in ¾ top view, the control panel with a track ball type control mechanism and a touch screen for presets and other options.

FIG. 28 Shown in ¾ top view, the control panel case 30 with its wiring harness 31, a track ball type control mechanism 34 and a touch screen 35 for presets and other options.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. A remotely controlled interior rear view mirror for a vehicle comprising:
    a reflective component mounted in a reflective frame, the reflective frame having a plurality of mounting tabs and mounted to a horizontal base component,
    the horizontal base component having a plurality of mounting tabs, the reflective frame mounting tabs align with the horizontal base component mounting tabs and are connected by an alignment pivot pin and a horizontal long driveshaft,
    the frame is mounted on a horizontal axis, allowing for adjustable movement of the reflective frame from up to down and down to up,
    the horizontal base component incorporates a horizontal mounting block which contains a vertical through hole,
    a vertical base component containing a lower support arm and an upper support arm, each support arm containing a through hole aligned on a vertical axis, the horizontal base mounting block engages the vertical base component between the vertical base lower and upper support arms on the vertical axis and connected via the vertical long driveshaft allowing for an established range of adjustable movement of the horizontal base component from left to right and right to left;
    a horizontal axis rotational motor for pivoting the reflective frame about the horizontal axis;

a vertical axis rotational motor for pivoting the horizontal base structure about the vertical axis;

a joystick control type mechanism mounted in a control panel case for setting the position of the reflective component frame on the horizontal axis, and for setting the position of the horizontal base structure on the vertical axis without ever touching the mirror.

2. The remotely controlled interior rear view mirror for a vehicle as claimed in claim 1 wherein the horizontal movement range is restricted by a limiting sensor.

3. The remotely controlled interior rear view mirror for a vehicle as claimed in claim 1 wherein the vertical movement range is restricted by a limiting sensor.

4. The remotely controlled interior rear view mirror for a vehicle as claimed in claim 1 wherein the horizontal axis rotational motor and the vertical axis rotational motor work in unison to offer a wide range of positions for viewing.

5. The remotely controlled interior rear view mirror for a vehicle as claimed in claim 1 wherein the mirror assembly is mounted into a cover which is then mounted to the frontal portion of an interior roof panel or directly to the windshield.

6. The remotely controlled interior rear view mirror for a vehicle as claimed in claim 1 wherein a control panel case comprises a plurality of preset location buttons and the joystick type control mechanism for operation by a user.

7. The remotely controlled interior rear view mirror for a vehicle as claimed in claim 6 wherein the user, by selecting and pressing one of the plurality of preset location buttons on the control panel case the mirror can be positioned in the specific user's preselected configuration.

8. The remotely controlled interior rear view mirror for a vehicle as claimed in claim 6 wherein the control panel case further comprises the joystick, whereby movement of the joystick in a particular direction causes the mirror to be positioned in a corresponding direction by signals sent to the horizontal axis rotational motor and vertical axis rotational motor.

9. The remotely controlled interior rear view mirror for a vehicle as claimed in claim 6 wherein the control panel case in another embodiment comprises a track ball type control mechanism to send directional signals to the rotational motors, whereby movement of the track ball in a particular direction causes the mirror to be positioned in a corresponding direction.

10. The remotely controlled interior rear view mirror for a vehicle as claimed in claim 6 wherein the control panel case in another embodiment comprises an electronic touchscreen for adjusting the position of the mirror.

11. A method of a remotely controlled interior rear view mirror for a vehicle, the method comprising:

a mirror component defining a reflective material for viewing behind a vehicle while facing forward in the vehicle;

mounting of a reflective component in a frame, the frame being mounted to a horizontal base component;

attaching the horizontal base component to a vertical base structure, attaching the vertical base component to an assembly case, attaching the assembly case to the vehicle's windshield or interior roof area;

attaching a horizontal axis rotational motor for pivoting the reflective component frame about a horizontal axis;

attaching a vertical axis rotational motor for pivoting the horizontal base structure about a vertical axis;

connecting a joystick control type mechanism to the horizontal axis and vertical axis rotational motors, the user controls set the position of the reflective component on a horizontal axis on the horizontal base structure, and the position of the horizontal base component on a vertical axis on the vertical base component;

additionally, the user controls have preset positions capability allowing for multiple users of the same vehicle, further the operator controls can reset the position of the mirror if it is accidentally bumped out of the predetermined safe range of rear angle viewing by input from an accelerometer and a plurality of limiting sensors.

* * * * *